(No Model.)
C. A. KÜNZEL.
FISHING DEVICE.
No. 467,123. Patented Jan. 12, 1892.
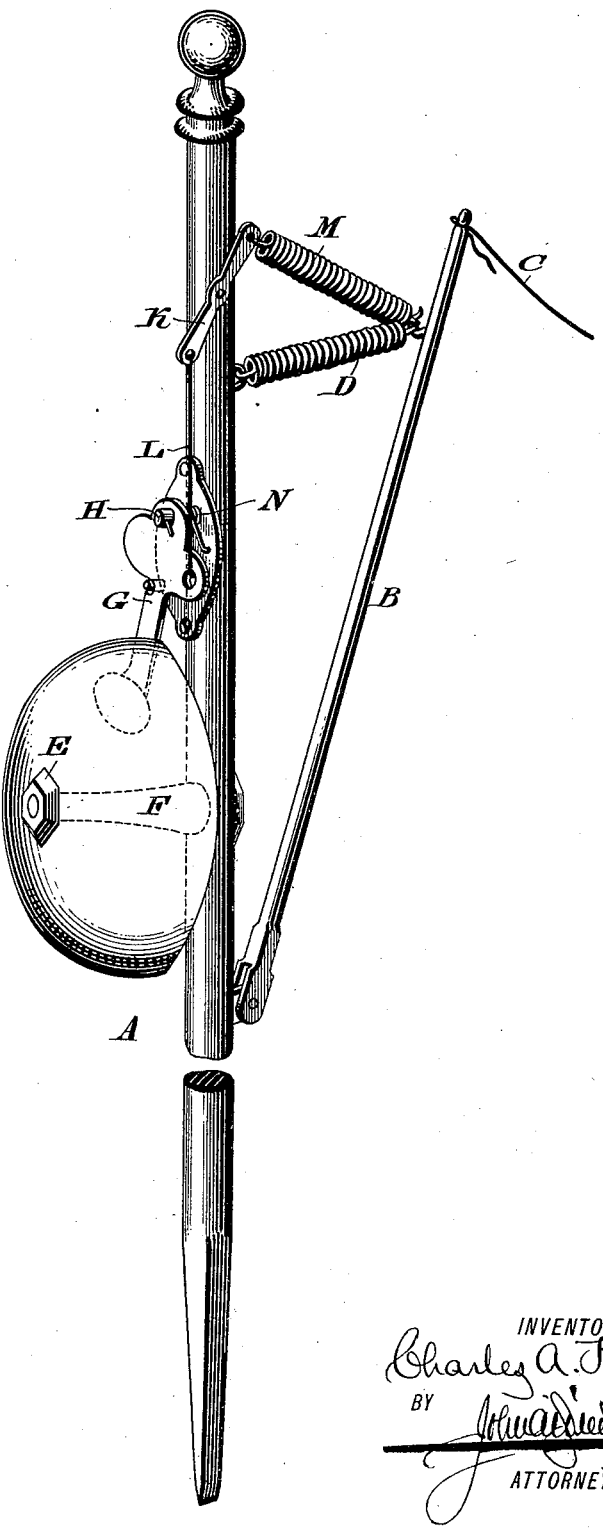
WITNESSES:
P. H. Nagle.
L. Douville.
INVENTOR
Charles A. Künzel
BY
John A. Niederberger
ATTORNEY.

UNITED STATES PATENT OFFICE.

CHARLES A. KÜNZEL, OF CAMDEN, NEW JERSEY, ASSIGNOR OF ONE-HALF TO CHARLES F. ELSER, OF PHILADELPHIA, PENNSYLVANIA.

FISHING DEVICE.

SPECIFICATION forming part of Letters Patent No. 467,123, dated January 12, 1892.

Application filed June 11, 1891. Serial No. 395,886. (No model.)

*To all whom it may concern:*

Be it known that I, CHARLES A. KÜNZEL, a citizen of the United States, residing in the city and county of Camden, State of New Jersey, have invented a new and useful Improvement in Fishing Devices, which improvement is fully set forth in the following specification and accompanying drawing.

My invention relates to improvements in fishing devices; and it consists of the combination of parts hereinafter described.

In the figure in the drawing, which represents a perspective view of a fishing device embodying my invention, A designates a standard, and B an arm pivoted thereto at one end and at the other adapted to have a fishing-line C attached thereto. A coil-spring D, secured to the standard and the upper end of the arm, serves to hold the latter in place.

E designates a gong or bell mounted on a post F, extending from and secured to the standard.

G designates the hammer-arm, pivoted on the stud H of a bracket or plate J, which is fastened to the standard. To a side projection or extended portion of the said arm G a pivoted lever K is fastened by means of a wire or rod L, the other end of said lever being connected by a coil-spring M with the arm B.

A spring N, having one end encircling the stud H and secured to the plate J and the other end bearing against the hammer-arm G, serves to insure the return of the said hammer-arm to its normal position after it has performed its stroke.

It will be seen that pulling on the upper end of the arm B moves the spring M, oscillating the lever K, and thus by means of the wire L the hammer-arm G, so as to strike an alarm. When the force is removed from the arm B, the spring D returns the same to its normal position, and the movement of the spring M, raising the upper limb of the lever K, so operates the hammer-arm as to remove the same from contact with the bell, restoring it to its normal position.

Having thus described my invention, what I claim as new, and desire to secure by Letters Patent, is—

1. A fishing device consisting of a standard, a spring-controlled arm pivoted directly to said standard and adapted to have a fishing-line secured thereto, a gong secured to said standard, a hammer-arm pivotally connected with said standard, and springs connected to said hammer-arm and said fishing-line arm, all combined substantially as described.

2. A fishing device consisting of a standard, a spring-controlled arm pivotally secured directly to said standard, a gong attached directly to the standard, a hammer-arm pivotally connected with the standard, a lever pivotally secured to the standard above the gong, a wire connecting the one limb of said lever with the hammer-arm, a spring connected to the other limb of the lever and to the pivoted line-arm, and a spring connecting the said pivoted line-arm with the standard, both of said springs being connected to one point on the line-arm, said parts being combined substantially as described.

3. A fishing device consisting of a standard, a fishing-line arm pivoted thereto at one end, a spring secured to the other end of the arm and the standard, a bell on said standard, a plate secured to the standard and having a post therein with a hammer-arm pivoted thereto, a pivoted lever secured at one end to said hammer-arm by a rod, a coil-spring connecting the other end of the lever with the fishing-line arm, and a spring secured to the plate and bearing against the said hammer-arm, said parts being combined substantially as described.

CHARLES A. KÜNZEL.

Witnesses:
JOHN A. WIEDERSHEIM,
A. P. JENNINGS.